US 8,319,699 B2

(12) United States Patent
Clodfelter

(10) Patent No.: US 8,319,699 B2
(45) Date of Patent: Nov. 27, 2012

(54) MULTIPLE DISPLAY CHANNEL SYSTEM WITH HIGH DYNAMIC RANGE

(75) Inventor: Robert Mark Clodfelter, Dayton, OH (US)

(73) Assignee: Barco N.V., Kortrijk (BE)

(*) Notice: Subject to any disclaimer, the term of this patent is extended or adjusted under 35 U.S.C. 154(b) by 1279 days.

(21) Appl. No.: 11/889,089

(22) Filed: Aug. 9, 2007

(65) Prior Publication Data
US 2009/0040133 A1 Feb. 12, 2009

(51) Int. Cl.
G09G 5/00 (2006.01)
(52) U.S. Cl. .......................... 345/1.1; 345/87
(58) Field of Classification Search ............ 345/1.1–1.3, 345/87–104, 204
See application file for complete search history.

(56) References Cited

U.S. PATENT DOCUMENTS

| | | | |
|---|---|---|---|
| 5,978,142 A | 11/1999 | Blackham et al. | |
| 6,456,339 B1 * | 9/2002 | Surati et al. | 348/745 |
| 6,480,175 B1 * | 11/2002 | Schneider | 345/32 |
| 6,985,272 B2 | 1/2006 | Bridgwater et al. | |
| 7,364,304 B2 * | 4/2008 | Nomizo et al. | 353/30 |
| 7,470,032 B2 * | 12/2008 | Damera-Venkata et al. | 353/94 |
| 2003/0067587 A1 * | 4/2003 | Yamasaki et al. | 353/30 |
| 2005/0046700 A1 * | 3/2005 | Bracke | 348/218.1 |
| 2005/0117126 A1 * | 6/2005 | Miyazawa et al. | 353/94 |
| 2005/0162737 A1 * | 7/2005 | Whitehead et al. | 359/454 |
| 2005/0206856 A1 * | 9/2005 | Ishii | 353/94 |
| 2006/0126171 A1 * | 6/2006 | Whitehead et al. | 359/443 |
| 2006/0290890 A1 * | 12/2006 | Saito et al. | 353/30 |
| 2007/0047043 A1 * | 3/2007 | Kapellner et al. | 359/30 |
| 2007/0097334 A1 * | 5/2007 | Damera-Venkata et al. | 353/94 |
| 2007/0103599 A1 | 5/2007 | Wen-Chin | |
| 2008/0036971 A1 * | 2/2008 | Hasegawa | 353/30 |
| 2008/0043034 A1 * | 2/2008 | Whitehead et al. | 345/617 |
| 2008/0094426 A1 * | 4/2008 | Kimpe | 345/691 |
| 2008/0143969 A1 * | 6/2008 | Aufranc et al. | 353/30 |
| 2008/0246781 A1 * | 10/2008 | Surati et al. | 345/690 |
| 2008/0284677 A1 * | 11/2008 | Whitehead et al. | 345/1.3 |
| 2009/0015791 A1 * | 1/2009 | Chang et al. | 353/6 |

FOREIGN PATENT DOCUMENTS

WO WO 01/96907 A3 12/2001
WO WO 2006/045585 A1 5/2006

* cited by examiner

Primary Examiner — Alexander Eisen
Assistant Examiner — Nelson Lam
(74) Attorney, Agent, or Firm — Bacon & Thomas, PLLC

(57) ABSTRACT

A multi-channel display system comprises a plurality of display devices, each display device having a non-pixel addressable light output part, e.g. a backlight, and a pixel addressable light output part, e.g. an LCD panel, in an optical path. The non-pixel addressable light output part and the pixel addressable light output part are arranged to both have a temporal modulation, so that a perceivable optical output of the display device is a combination of the outputs of the temporal modulation of the pixel addressable light output part and the temporal modulation of the non pixel addressable light output part. At least two of the display devices are arranged for displaying adjacent image parts. The display system furthermore comprises a linking means for linking the driving of the non pixel addressable light output part of at least the two display devices being arranged for displaying adjacent image parts.

11 Claims, 5 Drawing Sheets

MULTIPLE DISPLAY CHANNEL SYSTEM WITH HIGH DYNAMIC RANGE

TECHNICAL FIELD OF THE INVENTION

The present invention relates to multiple display channel apparatus, and more particularly to multiple display channel apparatus with high dynamic range as well as to methods of manufacture and operation of the same as well as software for carrying out the methods.

BACKGROUND OF THE INVENTION

Dynamic range or contrast ratio is the ratio of intensity of the highest luminance parts of a scene and the lowest luminance parts of a scene. For example, an image projected by a prior art video projection system may typically have a maximum dynamic range of 300:1. It is desired to have image display apparatus with higher dynamic range.

Image display apparatus with enhanced dynamic range are known. U.S. Pat. No. 5,978,142 describes a monochromatic image display apparatus comprising projector means, a light source, a first modulator, a second modulator and relay means, the first and second modulators both being such as to modulate light received from the light source, the first modulator modulating the light to produce an image, the relay means optically relaying the image to the second modulator, the second modulator being such as to further modulate the image to perform optical image enhancement whereby finite minimum brightness above true black is reduced, whereby contrast range of the projected image is extended, and whereby the optical image enhancement achieved is determined by a driving signal to the second modulator.

U.S. Pat. No. 6,985,272 applies the above technique to multi-colour image display apparatus and describes an image display apparatus comprising projector means, optical means for splitting incident light into red, green and blue light, a first modulator for modulating red light, a second modulator for modulating green light, a third modulator for modulating blue light, and optical means for recombining the modulated red light, green light and blue light. A fourth modulator is provided for modulating the combined red light, green light and blue light, and control means in the form of look-up tables for controlling the operation of the first, second, third and fourth modulators such that the dynamic range of the image display apparatus is enhanced.

It is known in the industry that the dynamic range of video images produced by light modulators such as LCD and others can also be extended by dynamically modulating the intensity of the backlight illumination system in response to the desired intensity of its video input. This intensity change may be essentially equal across the backlight of the entire display.

WO 2006/045585 describes a display with a backlight having a temporal modulation applied and a pixel addressable LCD in an optical path, the pixel addressable LCD being arranged to output each pixel of a frame as a temporal sequence of output values, different values of the sequence coinciding with different output levels of the modulated backlight. The apparent luminance or colour of the pixels can be made to take intermediate values between the gradations dictated by the stepsize corresponding to a least significant bit of the pixel addressable LCD, to enable more accurate reproduction of both colour and greyscale images. A convertor generates a temporal modulation of the pixels for the LCD according to a value of the pixels in an input signal, and synchronised to the temporal modulation of the backlight.

Display results when applying the above backlight modulation technique to multiple display channel applications are not satisfactory as disturbing artefacts between adjacent images are noticeable.

SUMMARY OF THE INVENTION

It is an object of the present invention to provide good apparatus or methods for displaying images with high dynamic range in multiple display channel applications. With "high dynamic range" in the context of the present description is meant a dynamic range of at least 1,000:1 or more, preferably at least 10,000:1.

The above objective is accomplished by a method and device according to the present invention.

In a first aspect, the present invention provides a display system comprising a plurality of display devices, each display device having a non-pixel addressable light output part, e.g. a backlight or a controllable light source, and a pixel addressable light output part, e.g. a light modulator, such as for example an LCD panel, in an optical path. The non-pixel addressable light output part and the pixel addressable light output part are arranged to both have a temporal modulation, so that a perceivable optical output of the display device is a combination of the outputs of the temporal modulation of the pixel addressable light output part and the temporal modulation of the non pixel addressable light output part. In the display system according to embodiments of the first aspect of the present invention, at least two of the display devices are arranged for displaying adjacent image parts. In accordance with embodiments of the present invention, the display system furthermore comprises a linking means for linking the driving of the non pixel addressable light output part of at least the two display devices being arranged for displaying adjacent image parts.

It is an advantage of embodiments of the present invention that an enhanced dynamic range of the display system is obtained by the modulation of the non pixel addressable part. It is a further advantage that a limited number, a reduced number or even no disturbing artefacts occur between adjacent image parts due to the presence of the linking means which prevents adjacent image parts from having completely different black and white image levels.

In a display system according to embodiments of the present invention the linking means may comprise a controller adapted to set a global value for the driving of the temporal modulation of the non pixel addressable light output parts of at least the two display devices being arranged for displaying adjacent image parts. Such algorithm is advantageous in that it is simple and easy to implement. The linking means may comprise a controller adapted to set a global value for the driving of the temporal modulation of the non pixel addressable light output parts of each of the plurality of display devices.

The controller may be adapted to determine the global value for the driving of the temporal modulation of the non pixel addressable light output parts based on the maximum and minimum video levels to be displayed by at least the two display devices being arranged for displaying adjacent image parts.

The linking means may comprise a controller adapted to provide a gradient in luminance levels displayed by at least the two display devices arranged for displaying adjacent image parts. This has the advantage that channels with bright imagery can be operated with a high intensity backlight setting, while channels with dark imagery can be operated with a low intensity backlight setting. On top of that, still limited or reduced or even no visible artefacts are present at seems between adjacent image parts.

The non-pixel addressable light output part of the display system may comprise a controllable light source, and the pixel addressable light output part may comprise a transmissive or reflective part.

In a second aspect, the present invention provides a method for driving a display system comprising a plurality of display devices, each display device having a non-pixel addressable light output part and a pixel addressable light output part in an optical path. The method comprises driving the non pixel addressable light output parts of the display devices, the driving including temporal modulation of the drive level depending on image content to be displayed, and individually applying temporal modulation to the pixel addressable light output parts of the plurality of display devices for generating the image. The combined output of the temporal modulation of the non pixel addressable light output part and the temporal modulation of the pixel addressable light output part of a display device generates a perceivable optical output of the display device. In accordance with embodiments of the present invention, driving the non pixel addressable light output parts of the display devices comprises synchronising the dynamic range of at least two display devices arranged for displaying adjacent image parts.

In accordance with embodiments of the present invention, synchronising the dynamic range of at least two display devices arranged for displaying adjacent image parts may comprise determining an overlapping dynamic range common to at least the two display devices arranged for displaying adjacent image parts, and using this overlapping dynamic range for driving the non pixel addressable light output parts of at least the two display devices arranged for displaying adjacent image parts. Synchronising the dynamic range may include determining an overlapping dynamic range common to all display devices in the display system and using this overlapping dynamic range for driving the display devices.

In embodiments of the present invention, synchronising the dynamic range of at least two display devices arranged for displaying adjacent image parts may include determining the dynamic range of at least the two display devices arranged for displaying adjacent image parts, and adding a dynamic range gradient to the driving of at least one of the display devices arranged for displaying adjacent image parts.

In a further aspect, the present invention provides a control unit for a multi-channel display system comprising a plurality of display devices, each display device having a non-pixel addressable light output part and a pixel addressable light output part in an optical path. The control unit comprises means for driving the non pixel addressable light output parts of the display devices, the driving including temporal modulation of the drive level depending on image content to be displayed, and means for individually applying temporal modulation to the pixel addressable light output parts of the plurality of display devices for generating the image. The combined output of the temporal modulation of the non pixel addressable light output part and the temporal modulation of the pixel addressable light output part of a display device generates a perceivable optical output of the display device. The control unit furthermore comprises means for synchronising the dynamic range of at least two display devices arranged for displaying adjacent image parts.

In a further aspect, the present invention provides a computer program product for executing any of the methods according to embodiments of the present invention when executed on a computing device associated with a multi-channel display system. The computer program product provides the functionality of any of the methods according to embodiments of the present invention when executed on a computing device associated with a multi-channel display system. The program may run under an operating system, and may include a user interface that enables a user to interact with the program, for example a choice between different algorithms may be made by a user.

The computer program product may be part of a computer software product (i.e. a carrier medium) that includes one or more code segments that cause a processor such as a CPU of the processing system to carry out the steps of the method. The computer program product can be tangibly embodied in a carrier medium carrying machine-readable code for execution by a programmable processor. Hence, the present invention also provides a machine readable data storage device for storing the computer program product according to embodiments of the present invention. The term "carrier medium" or "machine readable data storage device" or "data carrier" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a diskette, a memory key, a tape, a memory chip or cartridge or any other medium which stores the computer program product in a machine readable form and from which a computer can read. Various forms of computer readable media may be involved in carrying one or more sequences of one or more instructions to a processor for execution.

Nowadays, such software is often offered on the Internet or a company Intranet for download, hence the present invention includes transmitting the computer program product according to embodiments of the present invention via a carrier wave over a local or wide area network, such as a LAN, a WAN or the Internet. Transmission media include coaxial cables, copper wire and fibre optics, including the wires that comprise a bus within a computer. The computing device may include one of a microprocessor and an FPGA.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
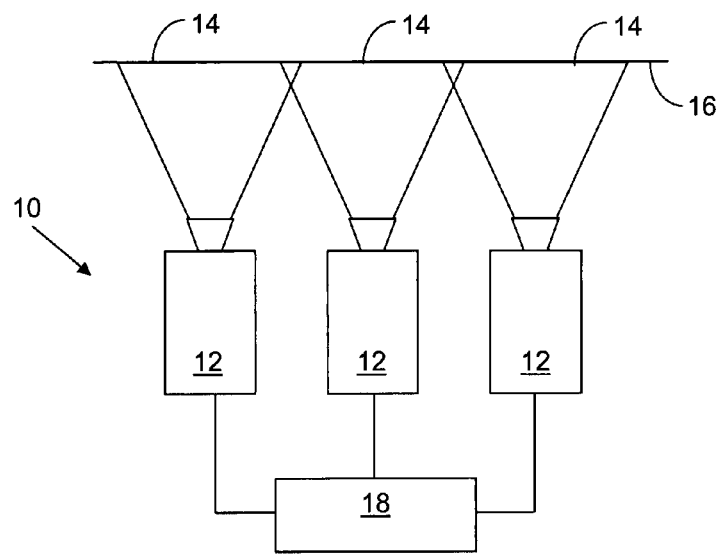
FIG. 1 is a schematic top view of a multi-channel display system according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The embodiments described relate to a scheme that includes at least a combined modulation in time of both pixel data and backlight illumination (in luminance and/or colour point) of a plurality of display devices of a multi-channel display system. According to embodiments of the present invention, a linking mechanism is provided between the plurality of display devices, which linking mechanism can ensure continuity between multiple abutted or blended image parts provided by each of the display devices on a common display screen, the display screen including a system of segmented screens with one or more projectors projecting images on a screen segment. The segmented screens may be adjacent to one another. Without such a linking mechanism, each display device may determine its own local optimum settings, in particular backlight settings, that will lead to disturbing artifacts between adjacent images in the form of differing black and white image levels. The present invention discloses the uses of such a link and corresponding control algorithms to balance the video images within and between multiple channels to produce a complete seamless image of maximal dynamic range and fidelity.

Figure 2:
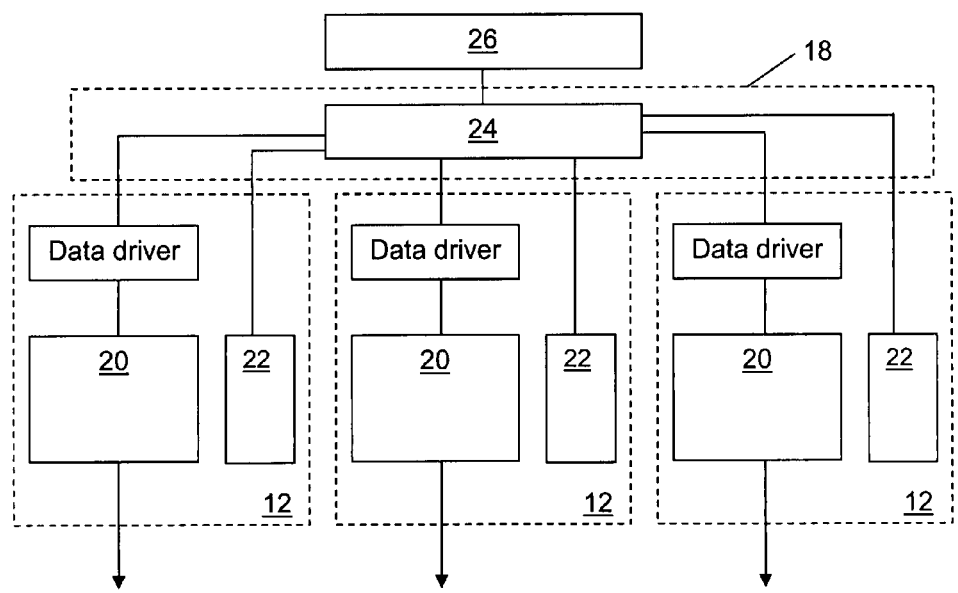
FIG. 2 is a diagrammatic illustration of a first embodiment of the display system as illustrated in FIG. 1.
Figure 3:
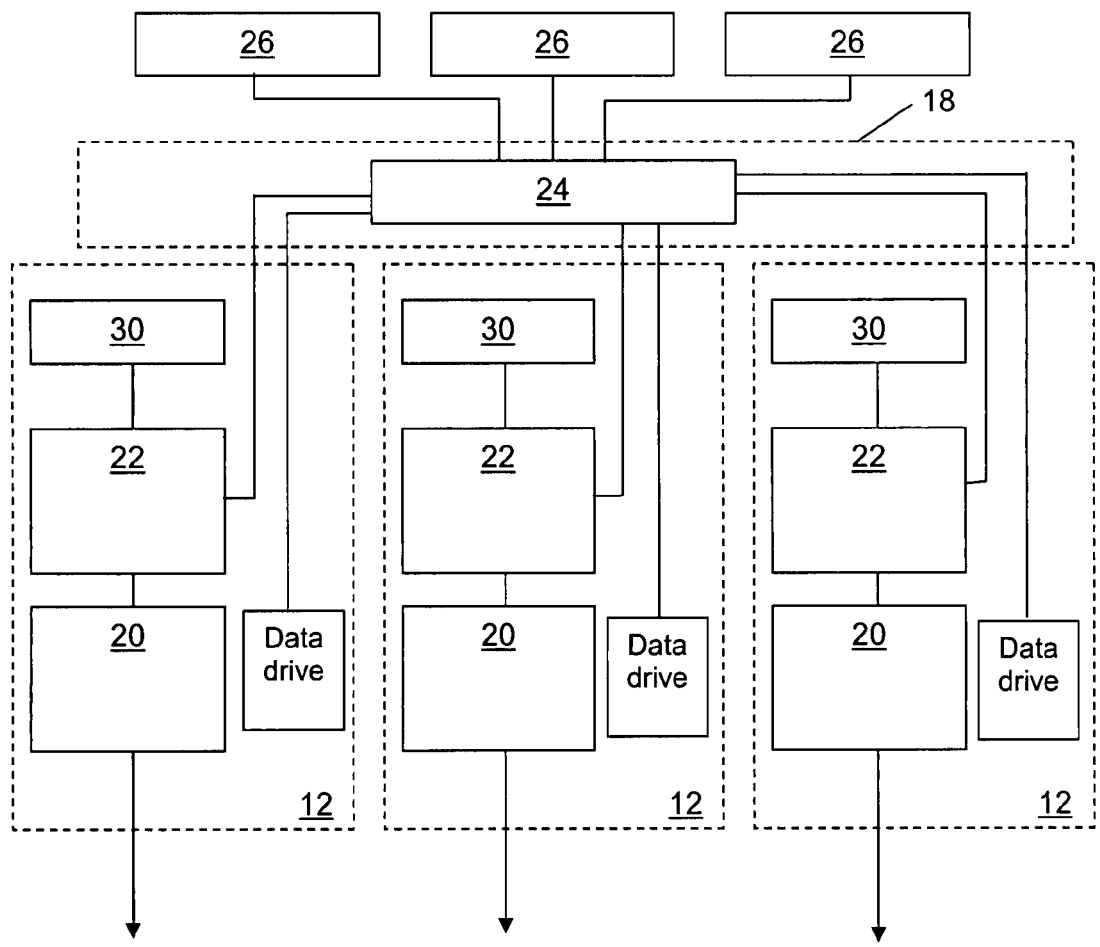
FIG. 3 is a diagrammatic illustration of a second embodiment of the display system as illustrated in FIG. 1.

In a typical set-up of a multi-channel display system, each display device provides its part of a complete image to be shown on a display screen, the display screen being a single display screen or a segmented display screen, and these parts are put adjacent each other on the display screen so as to form the image to be displayed. In the embodiments of FIG. 1, FIG. 2, and FIG. 3, 3 display devices on a row are illustrated, each providing a part of the complete image to be shown, the complete image being an image formed by these three image parts. In other embodiments, however not illustrated, more or fewer display devices may be provided, and they do not need to be aligned. Any regular or irregular array of adjacent or overlapping image parts may be shown, so as to form a complete image.

FIG. 1 is a top view of a multi-channel display system 10 in accordance with an embodiment of the present invention. The multi-channel display system 10 comprises a plurality of display devices 12, in the embodiment illustrated in FIG. 1 for example three projection devices, each for projecting an image part 14 onto a common display screen 16, the image parts 14 together forming a complete image to be displayed. The common display screen 16 may be a single display screen, or may be composed of a plurality of segmented display screens. The image parts are shown in FIG. 1 as partially overlapping. However, abutted operation is also possible as part of embodiments of this invention. According to embodiments of the present invention, a linking mechanism 18 is provided between the plurality of display devices 12, which linking mechanism 18 can ensure continuity between multiple abutted or blended image parts 14 provided by each of the display devices 12 on a common display screen 16.

FIG. 2 is a schematic view of a first embodiment of a multi-channel display system 10 as in FIG. 1.

The display devices 12 may be any suitable display devices, such as for example full projectors, stand-alone projection boxes or monitors. In the following description, projectors are considered, but this is not intended to be limiting for the invention. All kinds of electronic display devices are suitable display devices in the light of the present invention, especially fixed format display devices such as liquid crystal displays (LCD), digital light processor (DLP) displays, MEMS based grating light valve (GLV) or GEMS displays which may be used in projection or direct view concepts. Monochrome and colour displays, and transmissive, diffractive, reflective and trans-reflective display technologies fulfilling the feature that each pixel or sub-pixel is individually addressable, are included within the scope of the present invention. Displays useful for the present invention may display an arbitrary video or still image by at least using selective addressing of pixels and or sub-pixel elements of the display.

FIG. 2 shows in more detail a first embodiment of display devices 12 for use in the present invention, in which each display device 12 has a pixel addressable light output part 20 and a non-pixel addressable light output part 22 in an optical path. In the embodiment illustrated, the pixel addressable light output part may be a pixel addressable light modulator, e.g. an LCD panel, and the non pixel addressable light output part may be an optical source, e.g. a backlight of which the light output can be modulated.

In accordance with the present invention, the display system 10 comprises a linking mechanism 18 for linking the light output on the optical path of the plurality of display devices 12, and more particularly for linking their dynamic range, so that continuity in dynamic range between multiple abutted or blended images is obtained. In the embodiment illustrated in FIG. 2, the linking mechanism 18 comprises a processing element 24 for providing drive signals for driving these pixel addressable and non pixel addressable light output parts 20 and 22 of the display devices 12. The processing element 24 provides such drive signals to a display device 12 based on an input signal corresponding to the image part 14 to be shown by that display device 12 and based on the image part 14 to be shown by at least one neighbouring display device 12. The image part 14 to be shown by that display device 12 is a part of a larger image to be shown by the plurality of display devices 12 in the display system 10. A neighbouring display device 12 is a display device providing an image part 14 abutting to or blending with the image part 14 of the present display device 12. The processing element 24 provides drive signals for providing temporal modulations to the non pixel addressable light output part 22, e.g. backlight, and provides drive signals for providing temporal modulations to the pixel addressable light output part 20, so that the apparent luminance or colour of a pixel of the display device 12 will correspond to a desired average output, and so that continuity in dynamic range between multiple abutted or blended images is obtained. By averaging of a sequence of different combinations, the apparent luminance or colour of the pixels can be made to take intermediate values between the gradations dictated by the step size corresponding to a least significant bit of the control provided by the pixel addressable light output part 20. In other words, the amount of apparent quantization is increased in a selected part of the range, which enables more accurate reproduction of both colour and grey-scale images. There is some freedom to choose the values of the driving levels for the pixel addressable light output parts 20, as long as the combination of the temporal modulations to the pixel addressable light output parts and of the temporal modulations to the corresponding non pixel addressable light output part provides the desired output value.

The input to the linking mechanism 18, in particular to the processing element 24 thereof, is one or more image data signals encoding image parts to be displayed, the one or more image data signals emanating from at least one image source 26, such as e.g. an image generator (IG) for generating images to be displayed. This image data signal may be provided separately, i.e. by separate image sources 26, for each of the display devices 12, such as projectors, of the multi-channel display system 10, as illustrated in FIG. 3. This means that a plurality of image sources 26 may be provided, each providing an image part 14. Alternatively, the image data signals encoding the image to be displayed may be provided by a single image source 26, as illustrated in FIG. 2, and distributed over the plurality of display devices 12. Other embodiments, although not illustrated, are also covered by the present invention, e.g. in which at least one image source 26 provides image data signals encoding image parts 14 for at least two display devices 12, and at least another image source 26 provides image data signals encoding an image part 14 for at least another display device 12. The at least another display device 12 may be a single display device. The image source or image sources 26 may be any kind of image source, such as one or a plurality of cameras, or an IG, which is a computer or computing device adapted for generating images. In case a plurality of image sources 26 are provided, they may be of different types, for example a first image source comprising a plurality of cameras providing image data signals for a first display device 12, and a second image source comprising an image generator for providing image data signals for a second display device.

Other features, optionally taken from other embodiments, can be added to the features of this embodiment without departing from the present invention.

FIG. 3 illustrates a second embodiment of a multi-channel display system 10 in accordance with the present invention, in which a plurality of image sources 26 are provided for providing the plurality of image data signals encoding the image parts 14 together forming the image to be displayed. As in the previous embodiment, the plurality of image sources 26 can be of the same or different type. There may be the same number of image sources 26 as the number of display devices 12. In alternative embodiments, there may be more or fewer image sources 26 than display devices 12. One image source 26 can provide image data signals encoding image parts 14 to be displayed by one or more display devices 12. Alternatively, in this embodiment as well, a single image source 26 could be provided. In the embodiment illustrated in FIG. 3, the display devices 12 also comprise a pixel addressable light output part 20 and a non-pixel addressable light output part 22. The pixel addressable light output part 20 provides an image from light impinging on it. In this embodiment, the non-pixel addressable light output part 22 is separate from the backlight 30. In this embodiment, the backlight 30 is driven with substantially constant driving parameters, e.g. with a substantially constant drive current, and produces a substantially constant light output. The non-pixel addressable light output part 22 converts this constant light output into a modulated light output, and may for example be an LCD device or mechanical shutter or dimmer.

In accordance with embodiments of the present invention, the display system 10 comprises a linking mechanism 18 for linking the light output on the optical path of the plurality of display devices 12, and more particularly for linking their dynamic range, so that continuity in dynamic range between multiple abutted or blended images is obtained. In the embodiment illustrated in FIG. 3, the linking mechanism 18 comprises a processing element 24 which provides drive signals to drive the pixel addressable and non pixel addressable light output parts 20 and 22 of each of the display devices 12. The drive signals for the pixel addressable light output part 20 and the non-pixel addressable light output part 22 of each display device 12 are generated by the processing element 24 based on an image data signal encoding the image part 14 to be shown by that display device 12 and on the image data signal encoding an image part 14 to be shown by at least one neighbouring display device 12. The image part 14 to be shown by that display device 12 is a part of a larger image to be shown by the plurality of display devices 12 in the display system 10. A neighbouring display device 12 is a display device providing an image part 14 abutting to or blending with the image part 14 of the present display device 12. The processing element 24 provides temporal modulations to the non pixel addressable light output part 22, and provides temporal modulations to the pixel addressable light output part 20, so that the apparent luminance or colour of a pixel of the display device 12 corresponds to a desired average output, and so that continuity in dynamic range between multiple abutted or blended images is obtained.

Other features, possibly taken from other embodiments, can be added to the features of this embodiment without departing from the present invention.

According to embodiments of the present invention, the order of the pixel addressable and non pixel addressable light output parts 20, 22 in the optical path can be reversed, depending on whether an optical source is in either of the parts, as in FIG. 2, or before either of the parts, as in FIG. 3.

It is to be noted that in the above embodiments, the modulation frequency of the non pixel addressable light output part 22 does not need to be exactly the output frame rate of the display devices 12: a modulation period of a number of display frame periods is also possible. It is also possible to modulate at a higher frame rate than the output frame rate of the display system (for instance 100 Hz while the display output frequency is 50 Hz).

Figure 4:
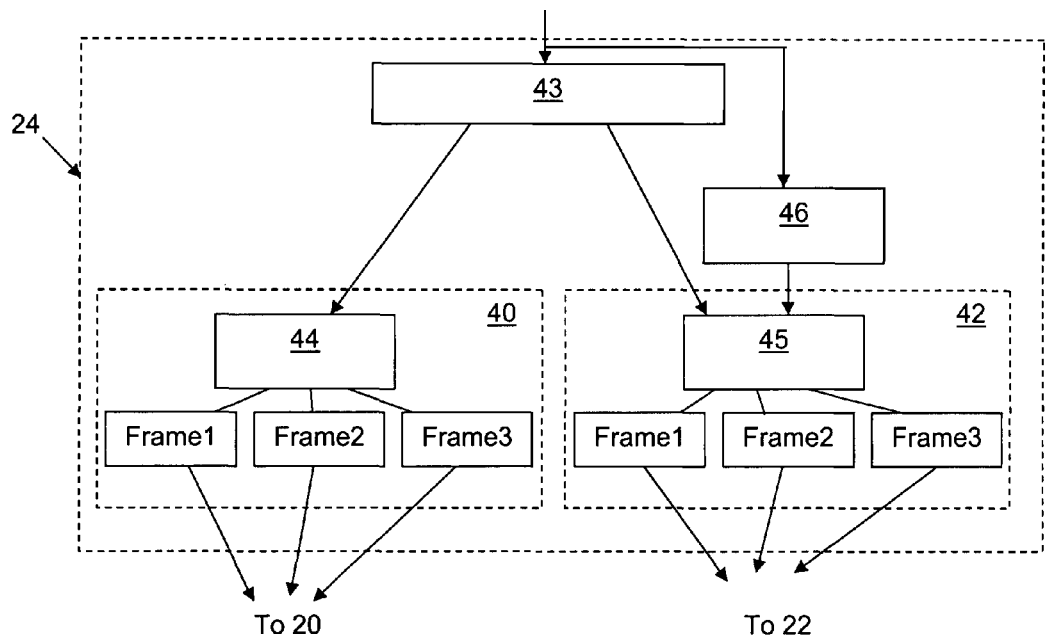
FIG. 4 is a schematic illustration of a processing element which can be used in a display system in accordance with embodiments of the present invention.

An embodiment of a suitable processing element 24 of the linking mechanism 18 is illustrated in FIG. 4.

The processing element 24 illustrated comprises means 40 for creating a temporal modulation drive signal for driving the pixel addressable light output part 20 and means 42 for creating a temporal modulation drive signal for driving the non pixel addressable light output part 22. Both means 40 and 42 are controlled by a controller 43.

The means 40 for creating a temporal modulation drive signal for driving the pixel addressable light output part 20 may be adapted so as to generate, from an input image data signal encoding an image part to be displayed by a particular display device 12, a time-series of image data drive signals for driving each pixel of the pixel addressable light output part 20 of the display device during a pre-determined time sequence. The means 42 for creating a temporal modulation drive signal for driving the non pixel addressable light output part 22 are adapted for, at the same time, providing corresponding drive signals for driving the non pixel addressable light output part 22, so that the combination of both sequences generates an apparent luminance or colour of all pixels of that display device 12 corresponding to the average output over the length of the time-sequence. The temporal sequences for each pixel of the pixel addressable light output part 20 may be created in this example by a look-up table 44, which generates a series of drive values for each pixel of the output signal. The series may be spread across a number of frame buffers (frame 1-frame 3), and the frame buffers may for example be read out one after another to drive the pixel addressable light output part 20. The temporal sequences for each pixel of the non pixel addressable light output part 22 may also be created in this example by a look-up table 45, which generates a series of drive values for the non pixel addressable light output part 22. The series may be spread across a number of frame buffers (frame 1-frame 3), and the frame buffers may be read out one after another to drive the non pixel addressable light output part 22.

A synchronisation circuit 46 may keep the drive signals for the non pixel addressable light output part 22 synchronised to the drive signals for the pixel addressable light output part 20, typically by synchronising to the input image data signal.

The processing element 24 can be implemented in conventional hardware or a mixture of hardware and software elements. The controller 43 of the processing element 24 may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA).

Hereinafter the invention is explained in more detail by reference to a specific embodiments.

For a Simple Projector Model, notations can be as follows:
$L_{Max}$: a projector's maximum possible luminance output
$CR_P$: a projector's Contrast Ratio (defined as its Peak light output divided by its minimum light output)
Projector Inputs:
$V_P$: Projector video input (0.0-1.0)
$G_P$: Projector backlight gain (0.0-1.0)
The light output of the simple projector model is therefore:

$$L_{OUTPUT} = G_P L_{Max}[(CR_P-1)V_P+1]/CR_P$$

The maximum $L_{OUTPUT}$ of a projector is therefore:

$$L_{OUTPUT\_MAX} = G_P L_{Max} \text{ when } G_P \text{ is } 1.0$$

The minimum $L_{OUTPUT}$ of a projector is therefore:

$$L_{OUTPUT\_MIN} = G_P L_{Max}/CR_P$$

In accordance with embodiments of the present invention the contrast ratio of the system is expanded across multiple display channels beyond the contrast ratio of the individual display devices. The system contrast ratio is defined as:
$CR_S$=System Maximum Luminance/System Minimum Luminance or thus $$CR_S = L_{OUTPUT\_MAX}/L_{OUTPUT\_MIN}$$

Substituting with the formulae for $L_{OUTPUT\_MAX}$ and $L_{OUTPUT\_MIN}$ given hereinabove this yields $$CR_S = L_{Max}/(G_P L_{Max}/CR_P) = CR_P/G_P$$

Solving for $G_P$ at the minimum light output gives:

$$G_{P\_MIN} = CR_P/CR_S$$

The Image Generator (IG) output $V_{IG}$ has a value between 0.0-1.0.
$V_{IG}=1$ to obtain a desired system brightness output of $L_{MAX}$
$V_{IG}=0$ to obtain a desired system brightness output of $L_{MAX}/CR_S$ With these definitions in mind it is now possible to define the algorithmic transformations necessary between the video source(s) 26 and the control inputs to the display devices 12.

In a first embodiment, a global control is provided, with equal settings to all display devices 12. The controller 43 of the linking mechanism 18 may comprise an algorithm sharing the maximum and minimum video levels required in each display device 12 or video channel between all channels and setting a global value for the non pixel addressable light output part, e.g. a global backlight value, as well as a global video gain factor for processing. From the image data signals emanating from the image source(s) 26, the processing element 24 determines the overall minimum luminance and maximum luminance levels. The overall minimum luminance level is the minimum luminance level of that one of the display devices 12 having the highest value for the minimum luminance level. The overall maximum luminance level is the maximum luminance level of that one of the display devices 12 having the lowest value for the maximum luminance level. In the example illustrated in FIG. 5, the minimum and maximum luminance levels of a first channel are given by min1 and max1, respectively (left hand side of FIG. 5), and the minimum and maximum luminance levels of a second channel are given by min2 and max2, respectively (right hand side of FIG. 5). In this case, the overall minimum and maximum luminance levels for these two panels are given by min1 and max2, respectively, as can be appreciated from FIG. 5.

These overall minimum and maximum luminance levels are used by the linking mechanism 18 for determining the drive signals to be used for each of the display systems 12. For any level of light source attenuation provided by the non pixel addressable light output part 22, e.g. backlight attenuation by modulating the backlight itself, it will be necessary to have a corresponding and reciprocal gain in the video level (assuming linear space).

Luminance=video level*video gain factor*backlight attenuation factor*backlight intensity For any scene at any one time, the instantaneous contrast of the scene is not increased over the native contrast of the projectors used to create the scene in the embodiment. However, as the displayed scene changes from nominally bright scenes to dark scenes and back, the display system will react and reduce or increase its maximum light output according to the scene and therefore extend the depth of its luminance range to maximize detail in the scene and increasing the effective system contrast.

The instantaneous maximum $V_{IG}$ across all displayed video inputs is defined as $V_{IG\_MAX}$. From this value, the desired system luminance at $V_{IG\_MAX}$ is determined from:

$$L_{SYSTEM\_MAX}=L_{Max}[(CR_S-1)V_{IG\_MAX}+1]/CR_S$$

As this is the maximum luminance required anywhere in the multi-channel image, all projector backlight gains may be adjusted such that the maximum output from each equals $L_{SYSTEM\_MAX}$. This has the advantage of suppressing the minimum black level in the image and maintaining the maximum dynamic range in the system even when operating at reduced luminance levels.

$$G_P=L_{SYSTEM\_MAX}/L_{Max}$$

$$G_P=[(CR_S-1)V_{IG\_MAX}+1]/CR_S$$

For practical reasons, $G_P$ may be limited to a lower bound such as $G_{P\_MIN}$.

For a given setting of $G_P$, the video input to the projector must be correspondingly modified as shown:

$$V_P=V_{IG}/G_P$$

In this mapping, the maximum luminance point for any setting of $G_P$ will match the desired luminance point for the system as defined over the entire system dynamic range. However, all other luminance levels will diverge from the system ideal towards the projector minimum for the given $G_P$ setting. This divergence occurs because the projector contrast is less than the desired system contrast and therefore the projector is unable to produce an image as dark as desired.

An alternative mapping may be defined as:

$$V_P=(V_{IG}-D)/(G_P-D)$$

where:

$$D=(CR_S G_P-CR_P)/(CR_P CR_S-CR_P)$$

This mapping has the advantage that the system matches any desired luminance level that is possible for the given $G_P$ setting. The disadvantage is that those darkest values that cannot be produced by the projector due to its contrast ratio limitation are clipped to the minimum luminance value possible for the $G_P$ setting.

Other mappings are also possible that combine the properties of these two mappings in order to reduce the deviations in desired luminance while avoiding the clipping of out of range values to a single minimum value.

The determination of the instantaneous maximum $V_{IG}$ value for any given scene may require temporal processing to account for inherent delays in the display system such as other image processing operations and the responsiveness of the control or modulation of the non pixel addressable light output part 22, e.g. back light control/modulation system. This processing may also be influenced by additional information from the image source(s) 26 such as Time Of Day (TOD) information typically available in the simulator environment. The temporal processing may also include elements related to the human visual system in order to avoid perceptually distracting changes in the image.

In a system of display devices 12, e.g. projectors, it is not normally the case that the maximum luminance and contrast values exactly match between the different display devices 12. However, it is known by those trained in the art how to match individual display devices 12, e.g. projectors, in this way prior to applying the above algorithms according to embodiments of the present invention for controlling a set of these display devices 12, e.g. projectors, dynamically. For example, one control not mentioned in this discussion is the common brightness control that effectively offsets the minimum possible luminance output. This control therefore sets the contrast ratio of the projector and can be used to match $CR_P$ between display devices 12, e.g. projectors.

Figure 5:
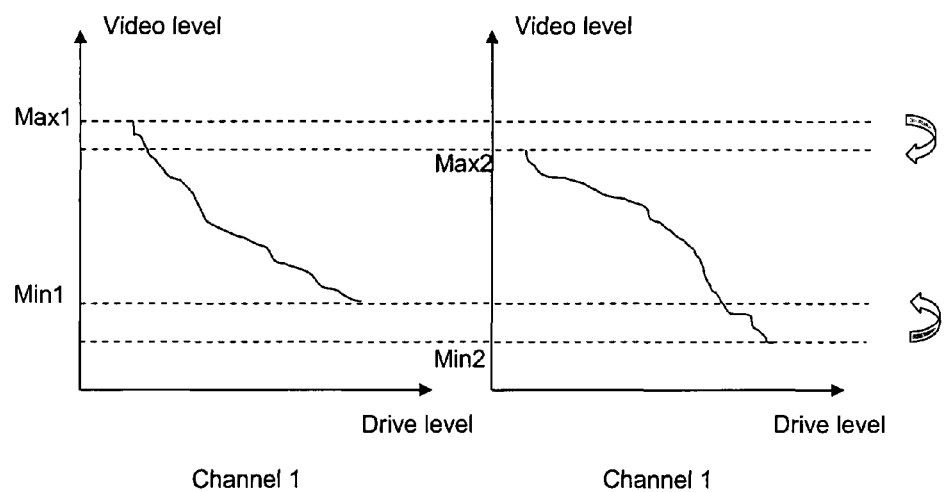
FIG. 5 illustrates how to determine overall minimum and maximum video levels over a plurality of channels in a multi-channel system, for use in accordance with an embodiment of the present invention.

It is also possible to modify the above algorithms to account for differences in the display device, e.g. projector, dynamic ranges and luminances directly in the algorithms themselves. This can be performed by using display device specific $L_{MAX}$ and $CR_P$ values for the display devices 12, e.g. projectors. This relates to what is illustrated in FIG. 5.

Figure 6:
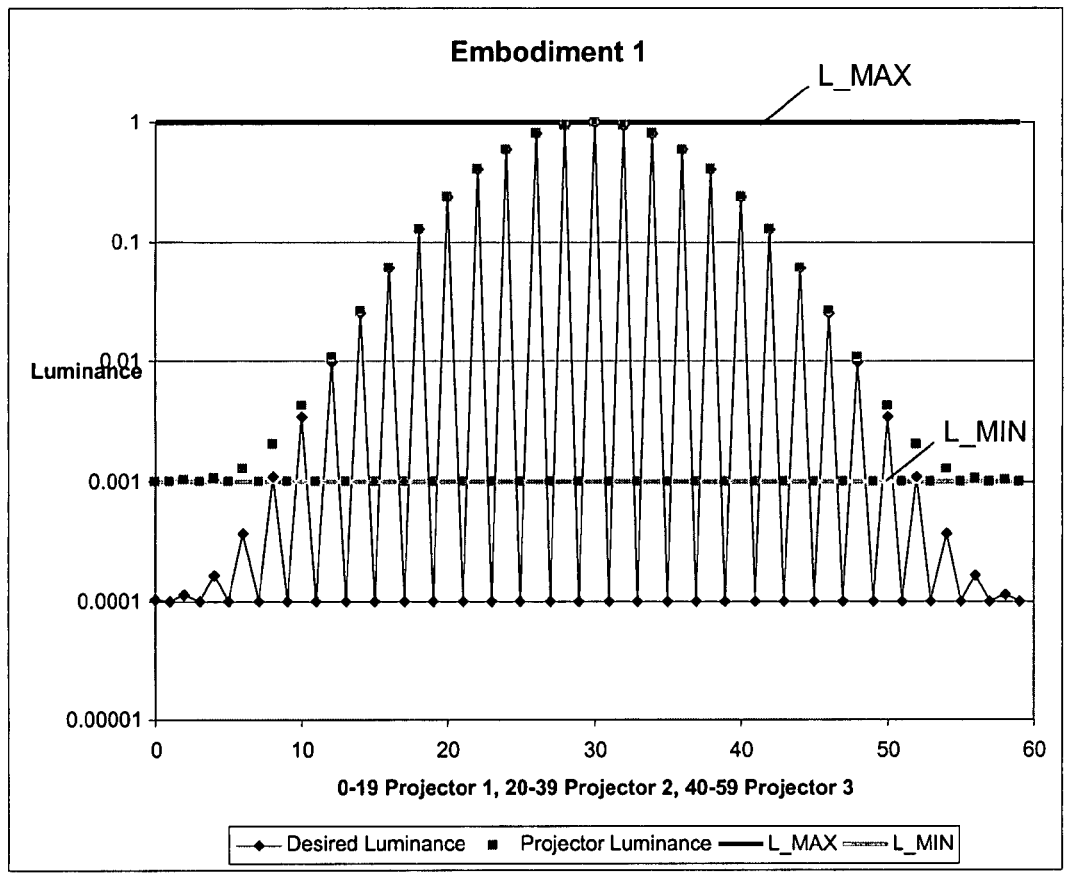
FIG. 6 illustrates different luminance values of three adjacent projectors controlled with an algorithm according to a first embodiment of the present invention.

In the graph given in FIG. 6, one sees that the $L_{MAX}$ and $L_{MIN}$ values are constant for all the display devices 12, in the example illustrated three projectors. The realized system contrast is limited to 1,000:1, equal to $CR_P$.

The first embodiment of the linked dynamic black system produces a visually continuous image with no discontinuities in the white, black or intermediate gray levels resulting from its operation. However, the display system is limited at any one time to the dynamic range of no more than that of an individual projector. It is possible to further extend the system dynamic ratio under certain operational conditions to that far beyond that of a single projector.

Imagine a system with two projectors side by side. The image to be displayed includes a full amplitude white square in the center of the first projector and black everywhere else. In the first embodiment, the backlight gain $G_P$ must be set to 1.0 as the total image includes a full white square implying a $V_{IG}$ of 1.0 at the location of the square. Now image, the situation for the second projector. Its $V_{IG}$ input is 0.0 everywhere. Ignoring the conditions imposed by the linking, its backlight gain could drop to the minimum value. In this case, the display would have a displayed contrast equal to the desired system contrast because the first projector would have a full white area and the second projector would have a maximally black area. The problem with this approach is that at the boarder or overlap between these two projectors a discontinuity will be seen. It is the intention of the second embodiment of this invention to eliminate this discontinuity and thereby expand the instantaneous contrast possible in a scene.

Figure 7:
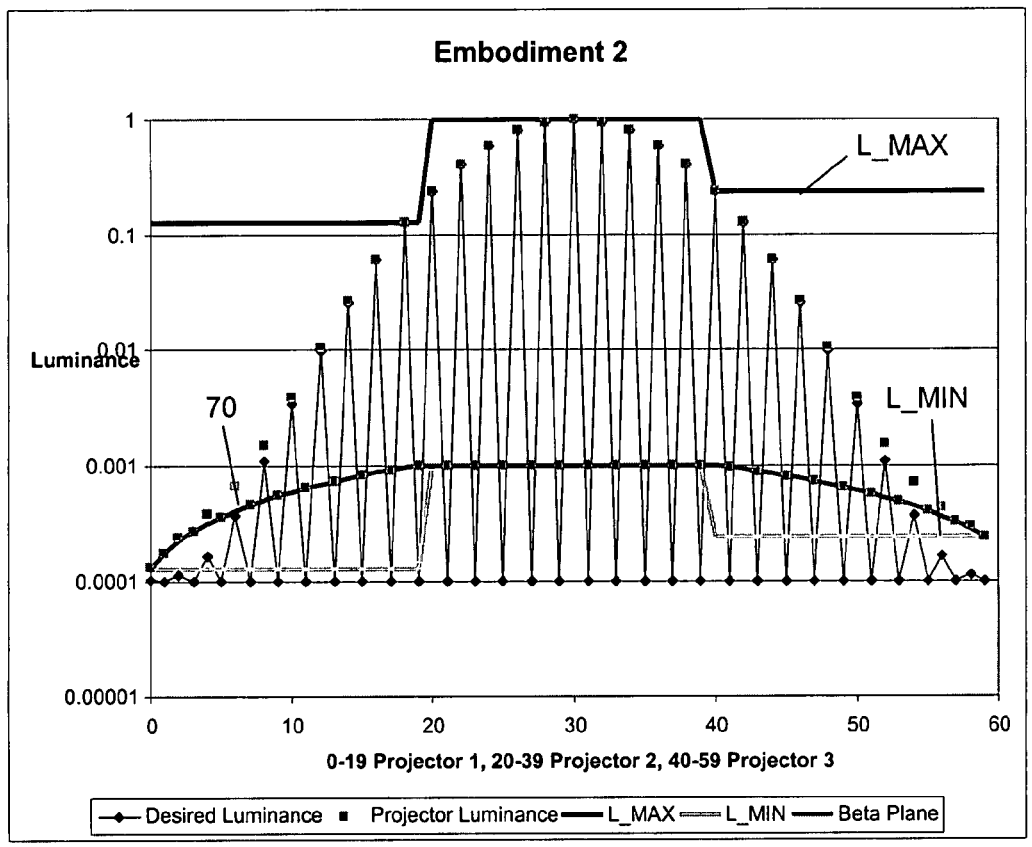
FIG. 7 illustrates different luminance values of three adjacent projectors controlled with an algorithm according to a second embodiment of the present invention.

In a second embodiment, individual control is provided, with unique settings to each display device 12. The controller 43 takes into account knowledge of the spatial arrangement of the channels or display devices 12, allowing for effective gradients to be developed between and within channels to allow channels with bright imagery to operate with a high intensity non pixel addressable light output part setting, e.g. backlight setting, while other channels with less bright imagery may be operated with lower intensity non pixel addressable light output part setting, e.g. with lower backlight intensity. This is illustrated in FIG. 7. The gradients between channels are calculated and applied to the channel via a spatially varying video gain factor and by matching black levels via the use of a "beta plane" that also varies across an individual image, thus allowing a much greater instantaneous dynamic range throughout the entire display than possible with conventional algorithms, while avoiding distracting luminance and black level differences between adjacent channels.

When going back to the example given above with respect to the first embodiment discontinuity is eliminated by the use of interpolative surfaces providing spatially dependent offset and gain variations to the $V_P$ signals to the projectors. In the situation described above, an offset and corresponding gain change is applied to the $V_P$ signals to the second projector. The offset would equalize the luminance at the interface between the two projected images. The offset would then reduce as the distance from the interface is increased. The rate and profile of the reduction may be linear, curved or any other shape that produces a pleasing affect to the observer minimizing the discontinuity. Since this spatially dependent offset effectively reduces $CR_P$ of the projector in its region of influence, the video gain factor between $V_{IG}$ and $V_P$ must also be modulated in this area.

The algorithm to be carried out may be as follows:
Using the equations outlined in embodiment 1, for each display device 12, e.g. projector, determine $V_{IG\_MAX}$, $L_{SYSTEM\_MAX}$, and $G_P$ based upon only the $V_{IG}$ input to the specific projector.

$$L_{SYSTEM\_MIN} = L_{SYSTEM\_MAX}/CR_P$$

Based upon the $L_{SYSTEM\_MIN}$ values for each display device 12, e.g. projector, and their spatial arrangement, determine a luminance surface for each display device 12, e.g. projector, that when added to the individual $L_{SYSTEM\_MIN}$ values, produces smooth surface across all projectors. This surface is identified as SmoothSurface(x,y). The notation (x,y) indicates that this surface is composed of spatially dependent values.

The projector video input $V_P$ can be determined as follows for each location in the image:

$$B_{OFFSET} = SmoothSurface(x,y)/(L_{SYSTEM\_MAX} - L_{SYSTEM\_MIN})$$

$$A_{GAIN} = (L_{SYSTEM\_MAX} - SmoothSurface(x,y))/(L_{SYSTEM\_MAX} - L_{SYSTEM\_MIN}))$$

$$V_P = A_{GAIN} V_{IG}/G_P + B_{OFFSET}$$

An example illustrates the process:
The system illustrated in FIG. 7 assumes $CR_S$ of 10,000:1 and a projector $CR_P$ of 1,000:1. Three projectors are assumed stacked three in a row left to right. In the graph of FIG. 7 the output of each projector is sampled at 20 points each. Projector one's samples are labelled 0-19, two's are labelled 20-39, and the third as 40-59. Only one dimension is shown for simplification purposes.

The input video follows a Gaussian curve with alternating pixels set to zero to show the performance at the black level in addition to the white. The desired luminance based upon the video level and $CR_S$ of 10,000:1 is shown with diamonds and an interconnecting line. The solid lines labelled L_MAX and L_MIN show the three projectors' maximum luminance and minimum luminance based upon their calculated backlight settings and contrast ratios. The projector luminance is shown by the squares. It can be clearly seen that the projector luminance overlays the desired luminance very well for the bright portions of the image and the track well to the minimum black levels possible for the $CR_P$ and backlight values.

One should notice that the realized system contrast is nearly 10,000:1 (actually 7662:1) despite the fact that the individual projector contrast is only 1,000:1 ($CR_P$). This is the benefit of embodiment two over embodiment one. In embodiment one, a contrast no better than the individual projectors' contrast ratio $CR_P$ is possible. The amount that the system contrast can be extended is highly dependent upon the images displayed. Very uniform images will have little expansion while images that are highly differentiated in a luminance sense between channels will have the greatest increase.

Also notice the Beta Plane line 70. This line 70 is representative of the smooth interpolation surface (SmoothSurface (x,y)) discussed earlier. This surface forces the normally disparate black levels illustrated by the L_MIN line with its discontinuities to smoothly join at the intersections of the projected images.

As will be appreciated by those skilled in the art, embodiments of the present invention may be embodied as a method, an apparatus such as a special purpose apparatus, or a carrier medium, e.g. a computer program product carrier medium carrying one or more computer readable code segments for controlling a processing element to carry out a set of steps. Accordingly, the present invention may take the form of an entirely hardware embodiment, an entirely software embodiment, or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM. For example, the computer program product may be part of a mass storage device, the computer program product having computer-readable program code segments.

It will be understood that the steps of methods discussed are performed in one embodiment by an appropriate processor such as the controller 43 of the processing element 24 shown in FIG. 4 executing instructions (code segments) stored in a storage (not illustrated). It will also be understood that the invention is not limited to any particular implementation or programming technique and that the invention may be implemented using any appropriate techniques for implementing the functionality described herein. The invention is not limited to any particular programming language or operating system.

The instructions (e.g. computer readable code segments in the storage) may be read from storage into memory. Execution of sequences of instructions contained in memory causes the controller 43 to perform the process steps described herein. In alternative embodiments, hard-wired circuitry may be used in place of or in combination with software instructions to implement the invention. Thus, embodiments of the invention are not limited to any specific combination of hardware circuitry and software.

The invention claimed is:
1. A display system comprising
   a plurality of display devices, each display device having a non-pixel addressable light output part and a pixel addressable light output part in an optical path, the non- pixel addressable light output part and the pixel addressable light output part being arranged to both have a temporal modulation, so that a perceivable optical output of the display device is a combination of the outputs of the temporal modulation of the pixel addressable light output part and the temporal modulation of the non-pixel addressable light output part, and at least two of the display devices being arranged for displaying adjacent image parts, wherein the display system furthermore comprises a linking means for linking the driving of the non-pixel addressable light output part of at least the two display devices being arranged for displaying adjacent image parts so that continuity in dynamic range is ensured between the image parts provided by each of the at least two display devices, and wherein the display system furthermore comprises a synchronisation circuit that synchronises the dynamic range of the at least two display devices by determining an overlapping dynamic range common to at least the two display devices arranged for displaying adjacent image parts, and by using this overlapping dynamic range for driving the non-pixel addressable light output parts of at least the two display devices arranged for displaying adjacent image parts.

2. A display system according to claim 1, wherein the linking means comprises a controller adapted to set a global value for the driving of the temporal modulation of the non-pixel addressable light output parts of at least the two display devices being arranged for displaying adjacent image parts.

3. A display system according to claim 1, wherein the linking means comprises a controller adapted to provide a gradient in luminance levels displayed by at least the two display devices arranged for displaying adjacent image parts.

4. A display system according to claim 1, wherein the non-pixel addressable light output part comprises a controllable light source, and the pixel addressable light output part comprises a transmissive or reflective part.

5. A display system according to claim 2, wherein the controller is adapted to determine the global value for the driving of the temporal modulation of the non-pixel addressable light output parts based on the maximum and minimum video levels to be displayed by at least the two display devices being arranged for displaying adjacent image parts.

6. A method for driving a display system comprising a plurality of display devices, each display device having a non-pixel addressable light output part and a pixel addressable light output part in an optical path, the method comprising driving the non-pixel addressable light output parts of the display devices, the driving including temporal modulation of the drive level depending on image content to be displayed, and individually applying temporal modulation to the pixel addressable light output parts of the plurality of display devices for generating the image, the combined output of the temporal modulation of the non-pixel addressable light output part and the temporal modulation of the pixel addressable light output part of a display device generating a perceivable optical output of the display device, wherein driving the non-pixel addressable light output parts of the display devices comprises synchronising the dynamic range of at least two display devices arranged for displaying adjacent image parts, and wherein synchronising the dynamic range of at least two display devices arranged for displaying adjacent image parts comprises determining an overlapping dynamic range common to at least the two display devices arranged for displaying adjacent image parts, and using this overlapping dynamic range for driving the non-pixel addressable light output parts of at least the two display devices arranged for displaying adjacent image parts.

7. A method according to claim 6, wherein synchronising the dynamic range includes determining an overlapping dynamic range common to all display devices in the display system and using this overlapping dynamic range for driving the display devices.

8. A computer device comprising loaded thereon a program product for executing the methods as claimed in claim 6, the computing device being associated with a multi-channel display system.

9. A non-transitory computer readable medium for storing the computer program product of claim 8.

10. A method for driving a display system comprising a plurality of display devices, each display device having a non-pixel addressable light output part and a pixel addressable light output part in an optical path, the method comprising driving the non-pixel addressable light output parts of the display devices, the driving including temporal modulation of the drive level depending on image content to be displayed, and individually applying temporal modulation to the pixel addressable light output parts of the plurality of display devices for generating the image, the combined output of the temporal modulation of the non-pixel addressable light output part and the temporal modulation of the pixel addressable light output part of a display device generating a perceivable optical output of the display device, wherein driving the non-pixel addressable light output parts of the display devices comprises synchronising the dynamic range of at least two display devices arranged for displaying adjacent image parts, wherein synchronising the dynamic range of at least two display devices arranged for displaying adjacent image parts includes determining the dynamic range of at least the two display devices arranged for displaying adjacent image parts, and adding a dynamic range gradient to the driving of at least one of the display devices arranged for displaying adjacent image parts.

11. A control unit for a multi-channel display system comprising a plurality of display devices, each display device having a non-pixel addressable light output part and a pixel addressable light output part in an optical path, the control unit comprising means for driving the non-pixel addressable light output parts of the display devices, the driving including temporal modulation of the drive level depending on image content to be displayed, and means for individually applying temporal modulation to the pixel addressable light output parts of the plurality of display devices for generating the image, the combined output of the temporal modulation of the non-pixel addressable light output part and the temporal modulation of the pixel addressable light output part of a display device generating a perceivable optical output of the display device, wherein the control unit furthermore comprises means for synchronising the dynamic range of at least two display devices arranged for displaying adjacent image parts, and wherein the control unit furthermore comprises means for determining an overlapping dynamic range common to at least the two display devices arranged for displaying adjacent image parts, and using this overlapping dynamic range for driving the non-pixel addressable light output parts of at least the two display devices arranged for displaying adjacent image parts.

* * * * *